R. T. WINDT.
LOCK FOR DEMOUNTABLE RIMS.
APPLICATION FILED NOV. 27, 1916.
1,257,296.
Patented Feb. 19, 1918.
2 SHEETS—SHEET 2.
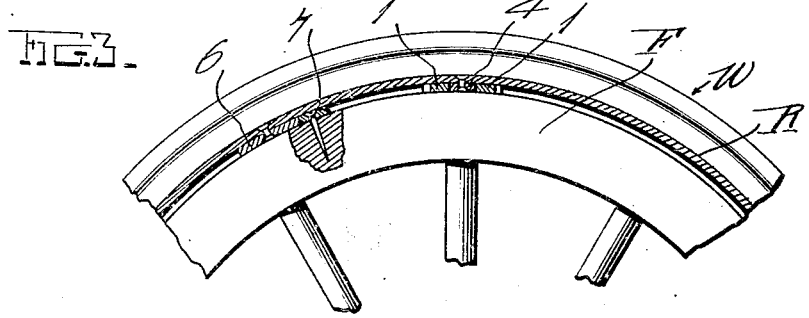
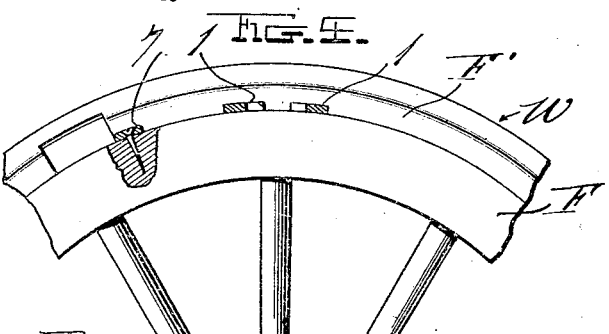
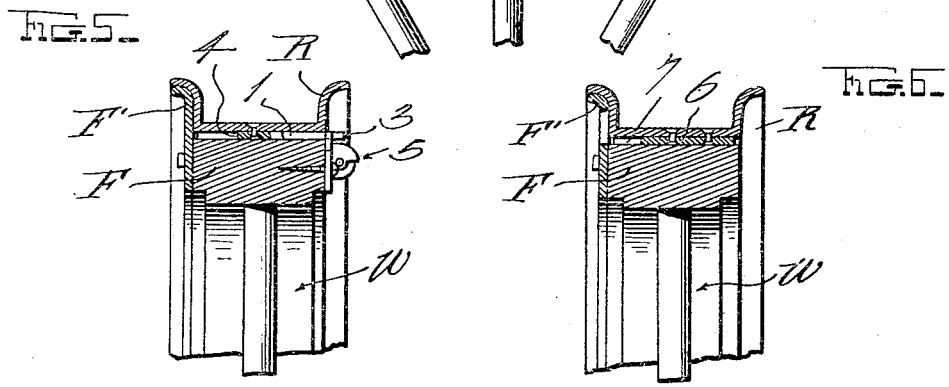
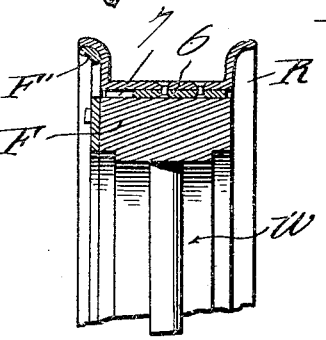
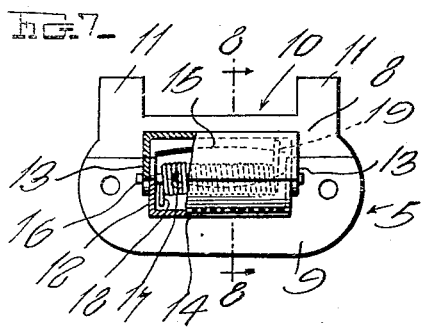
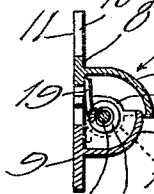
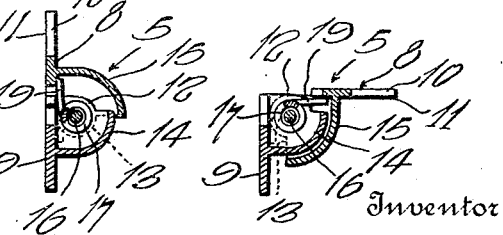
Witness
H. Woodard
Inventor
R. T. Windt
By H. R. Willison Yeo
Attorneys

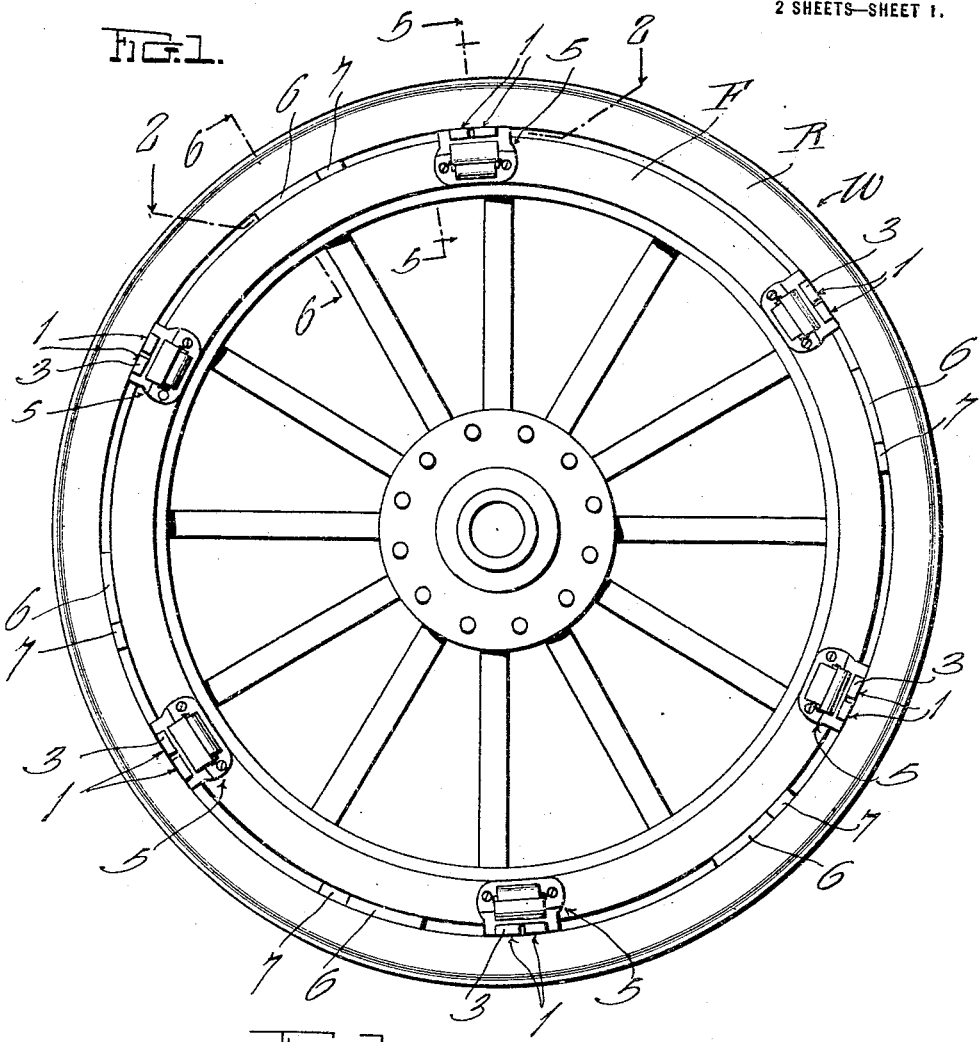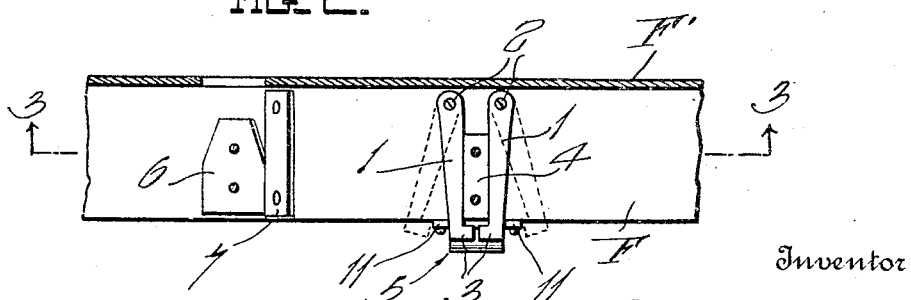

UNITED STATES PATENT OFFICE.

RUDOLPH T. WINDT, OF ST. LOUIS, MISSOURI.

LOCK FOR DEMOUNTABLE RIMS.

1,257,296.     Specification of Letters Patent.     Patented Feb. 19, 1918.

Application filed November 27, 1916. Serial No. 133,699.

*To all whom it may concern:*

Be it known that I, RUDOLPH T. WINDT, a citizen of the United States, residing at St. Louis and State of Missouri, have invented certain new and useful Improvements in Locks for Demountable Rims; and I do declare the following to be a full, clear, and exact description of the invention, such as will enable others skilled in the art to which it appertains to make and use the same.

This invention relates to improvements in automobile accessories, particularly in means for holding demountable rims to the wheels of a vehicle.

The principal object of the invention is to provide a device whereby an ordinary demountable rim may be held upon a wheel without the means of bolts or nuts.

An additional object is to provide means for allowing a demountable rim to be very quickly placed in position on a wheel or removed therefrom.

With these and many other objects in view, the invention resides in the novel features of construction, combination and arrangement of parts which will be more particularly set forth in the following specification and claims, and shown in the drawings wherein:

Figure 1 is a side elevation of an automobile wheel equipped with my invention;

Fig. 2 is a detail cross sectional view on the line 2—2 of Fig. 1;

Fig. 3 is a detail longitudinal sectional view on the line 3—3 of Fig. 2;

Fig. 4 is a view similar to Fig. 3 showing the rim removed;

Figs. 5 and 6 are transverse sections on the planes of the lines 5—5 and 6—6 of Fig. 1;

Fig. 7 is a side elevation partly in section of one of the locking members;

Fig. 8 is a vertical transverse section on the line 8—8 of Fig. 7; and

Fig. 9 is a similar view showing the parts in slightly different positions.

This improved means for holding the demountable rim R to a wheel W comprises broadly a plurality of pivoted latch members carried by the felly of the wheel, a number of stops secured to the inner surface of the rim, one for engagement with each set of the latch members, and a plurality of locking members for holding the latch members in operative position. The invention is shown applied to a wheel of ordinary construction, F representing the felly which has an annular flange F' formed on its inner edge, said flange being adapted to be engaged by the rim R to limit the inward movement of the latter, the outward movement as well as circumferential movement being prevented by the invention.

Specifically the device comprises a number of pairs of pivoted hook-shaped members 1 disposed at intervals around the felly and pivoted thereto adjacent the flange F' as shown at 2. Each of these members 1 is substantially L-shaped, the long arms overlying the periphery of the felly, while the short arms 3 are extended inwardly toward each other and disposed beyond the outer edge of the felly. Being pivoted at their inner ends, the members 1 may readily move toward and away from each other to permit the elongated stop plates 4 carried by the rim R to be disposed therebetween. One of these stop plates 4 is provided for each pair of members 1.

From the foregoing it will be seen that before the rim R can be placed upon the periphery of the wheel W it is necessary to spread the members 1 apart, but after the former is in position these members may be moved toward each other so that the arms 3 may engage the outer ends of the stop plates 4 to prevent the removal of the rim. When the locking members 5 are in operation, the members 1 will be prevented from spreading apart. The long arms of the members and the stop plates 4 also tend to prevent circumferential shifting of the rim upon the felly of the wheel, but in addition to these parts, positive stops are provided consisting of lugs 6 and 7 carried respectively by the wheel and the rim. These last mentioned stop plates are disposed at intervals around the periphery of the felly and rim and serve to uniformly space the latter from the former.

As hereinbefore mentioned, a locking member is provided for each pair of latch members 1, and each consists of a pair of plates 8 and 9, the latter being rigidly secured to the felly F, while the former is pivoted thereto. The plate 8 is recessed as shown at 10 to form a substantially U-shaped member having arms 11 which are disposed on the opposite sides of the latch members 1 as clearly shown in Figs. 1 and 2. In order to pivotally connect one plate with the other, a pair of spaced apart ears 12 is formed on the plate 9 for engagement with the ears 13 on the plate 8. The ears 12 are connected by a substantially semi-cylindrical housing 14 which is adapted to slide within a similar housing 15 whenever the plate 8 is moved about its pivot formed by the shaft 16, the latter connecting said ears. The shaft 16 is disposed within the two part housing as is also a helical spring 17 which surrounds said shaft. The opposite ends 18 and 19 of the spring are extended and engaged respectively with the plates 8 and 9. The last mentioned plate is apertured to receive fastening elements for holding the same to the felly. This spring normally retains the two plates 8 and 9 substantially vertically.

The operation of the device is as follows, the latch members 1 are spaced apart a distance sufficient to allow the stop plates 4 to be disposed between the long arms thereof, whereupon the rim R is placed upon the felly F and its rear edge engaged with the flange F'. After the rim has been properly seated each U-shaped plate 8 is successively moved outwardly away from the felly to permit the members 1 to be moved toward each other to position the arms 3 thereof in engagement with the outer ends of the stop plates 4. As the plates 8 are released, their springs will cause them to fly up into vertical position and receive the ends of the latch members 1 therebetween. This arrangement will prevent the latch members from spreading apart until the U-shaped locking plates are again manually forced outwardly against the tension of their springs. In removing the rim R from the wheel, the operations are reversed, in other words, the locking plates are disengaged from the latch members to permit the same to be moved apart.

In the foregoing it will be readily noted that an extremely simple method of securing a demountable rim to the felly of the wheel has been invented, this method doing away with the usual bolts and nuts which usually require much time and labor to remove. This invention will not only save much time and effort, but will also as reliably hold the rim to the wheel as any of the methods now in operation.

I claim:

1. In a wheel, the combination with a felly and a rim therefor; of a series of locking devices therefor, each of said devices comprising a stop plate secured to the inner face of the rim, a pair of transverse hook-shaped arms embracing said plate and pivoted to the outer face of the felly and a spring operated U-shaped locking plate mounted on said felly and adapted to engage said arms and lock them against movement.

2. In a wheel, the combination with a felly, and a rim therefor; of a series of locking devices therefor, each of said devices comprising a hook-shaped member, a stop to be engaged by the member, one being carried by the felly and the other by the rim, and a U-shaped locking plate adapted to receive the member between its arms to hold it in engagement with the stop.

3. In a wheel, the combination with a felly, and a rim therefor; of a series of locking devices therefor, each of said devices comprising a pivoted hook-shaped member, a stop to be engaged by the member, one being carried by the felly and the other by the rim, and a pivoted U-shaped locking plate adapted to receive the member between its arms to hold it in engagement with the stop.

4. In a wheel, the combination of a felly, and a rim therefor; of a series of locking devices therefor, each of said devices comprising a pair of hook-shaped members movable toward and away from each other, a stop to be received between said members, one being carried by the felly and the other by the rim, and a U-shaped locking plate adapted to receive the members between its arms to hold them in engagement with the stop.

5. In a wheel, the combination with a felly, and a rim therefor; of a series of locking devices therefor, each of said devices comprising a hook-shaped member pivoted to said felly, a locking member comprising a plate secured to the felly, a pair of spaced ears on said plate, a U-shaped plate, a pair of spaced ears on the last mentioned plate, a shaft connecting said ears, and a spring disposed around said shaft to retain the U-shaped plate in engagement with said hook-shaped member.

6. In a wheel, the combination of a felly, and a rim therefor; of a series of locking devices therefor, each of said devices comprising a pair of hook-shaped members movable toward and away from each other, said members being pivoted to the felly of said wheel, a stop to be received between said members and carried by said rim, and a locking member comprising a plate secured to the felly, a pair of spaced ears on said plate, a U-shaped plate, a pair of spaced ears on the last mentioned plate, a shaft connecting said ears, and a spring disposed around said shaft to retain said U-shaped plate in engagement with said hook-shaped members, the latter being adapted to be disposed between the arms of said plate.

In testimony whereof I have hereunto set my hand in the presence of two subscribing witnesses.

RUDOLPH T. WINDT.

Witnesses:
 FRANCIS C. GERBIG,
 J. F. WINDT.